Jan. 7, 1969  W. KOHLHAGEN  3,421,032
SYNCHRONOUS REACTION MOTOR WITH DEAD-SHAFT ROTOR MOUNT
Filed May 17, 1966

INVENTOR
Walter Kohlhagen
BY
Attorney.

United States Patent Office 3,421,032
Patented Jan. 7, 1969

3,421,032
SYNCHRONOUS REACTION MOTOR WITH DEAD-SHAFT ROTOR MOUNT
Walter Kohlhagen, Elgin, Ill., assignor to Amphenol Corporation, Broadview, Ill., a corporation of Delaware
Filed May 17, 1966, Ser. No. 550,684
U.S. Cl. 310—164   11 Claims
Int. Cl. H02k 19/00; 21/04

This invention relates to synchronous reaction motors in general, and to self-starting synchronous reaction motors in particular.

Motors of this type have a multipolar field of which alternate poles are of opposite polarity at any instant and change their polarity in phase with the alternating current supplied to the associated field coil, and a permanent-magnet rotor of which the poles cooperate with the field poles in driving the rotor in synchronism with the alternation of the current. These motors also have either a rotary or "live" shaft on which the rotor is turnably mounted, or a fixed or "dead" shaft on which the rotor is turnably mounted, with the live-shaft rotor mount having certain advantages over the dead-shaft rotor mount but being also much more costly than the latter. Thus, in a live-shaft mount with a lubricated shaft bearing support of permissible considerable length within the usual condensed framework of these motors, the bearing support of the shaft and rotor thereon assumes precision characteristics of a kind, with the result that the rotor encounters minimum friction in responding to the self-starting forces produced on each field coil reenergization, and the shaft and bearing will for the longest time be subjected to at most inappreciable wear under the inherently more or less non-uniform magnetic forces acting on the rotor in normal running and under the one-sided force on the shaft from the customary drive pinion thereon, with the rotor and shaft usually having also some unimpeded freedom for axial shake. Live-shaft rotor mounts thus contribute quite appreciably toward reliable self-starting and smooth running at the same high torque generation of these motors for the longest time, but they also incur considerable cost in the provision of the lubricated bearings of the required high grade for the characteristically very slender rotor shafts. Since cost saving is an important factor for most motors, and substantial cost saving is achieved with dead-shaft rotor mounts, the latter mounts are resorted to in many motors even though they are in performance secondary to live-shaft rotor mounts. Thus, in dead-shaft rotor mounts the bearing support of the rotor is restricted to the axial extent of the latter or of a bushing therein, and is for this reason usually considerably shorter than the available bearing support in a live-shaft rotor mount. In consequence, the rotor must have a fairly close fit on the dead shaft if the rotor is to have any adequate and, hence, lasting bearing support on the shaft. However, while this meets the requirement of an adequate and lasting bearing support for the rotor at tolerable bearing friction, it also leaves the rotor with virtually no freedom on its shaft, wherefore the rotor will on each self-start respond to the starting forces acting thereon with some impediment from the shaft, and will also transmit non-uniform forces acting on the rotor in normal running to the shaft through its bearing aperture, with the result that some starting as well as running torque is unavoidably sacrificed for the lower cost of dead-shaft rotor mounts. Further, dead-shaft rotor mounts have a tendency to become noisy in operation. Also, since the rotor is called upon to drive a coaxial pinion in most any motor application, the necessarily separate pinion must be drivingly connected with the rotor by means other than the dead shaft, which is customarily accomplished by providing a metallic bushing on which the rotor is mounted and by which it is journalled on the dead shaft and also drivingly connected with a pinion that may be carried by or formed integrally with the bushing. However, while such bushings are feasible for rotors of adequate strength to withstand either customary pressfitting therein or firm staking thereto of the bushings, they are not feasible for more and more preferred rotor materials of high magnetic field intensity, sometimes called "high-H" materials, such as barium ferrite or Lodex, for example, which are, however, quite brittle and will easily fracture on such bushing application. In view of this, recourse has been had to casting metallic bushings into center apertures of rotors of these high-H materials, but this is a costly procedure. Moreover, the provision of a bushing in a rotor in any manner does not relieve dead-shaft rotor mounts of the aforementioned sacrifice in rotor starting and running torque.

It is an important object of the present invention to provide for a motor of this type a dead-shaft rotor mount which not only has none of the aforementioned objectionable aspects of prior dead-shaft rotor mounts, but has for all practical purposes the same advantages as live-shaft rotor mounts in the respects of enhanced rotor starting, rotor running at the same torque generation for the longest time, yet its cost is no more than that of prior dead-shaft rotor mounts.

It is another object of the present invention to provide for a motor of this type a dead-shaft rotor mount which features a rotor-carrying bushing that not only provides an adequate bearing for the rotor on the dead shaft, but also affords the rotor adequate freedom to give way, without any impediment from the bushing, to any and all forces acting thereon except actual driving forces in rotor starting and running, whereby the initial rotor starting forces will exert themselves to the fullest on the unimpeded rotor and urge the same irresistably into a self-start with whatever torque is required to overcome an encountering load, while all operational forces on the starting and running rotor other than pure driving forces, and hence potential wearing and torque reducing forces, are rendered harmless by absorption by the unimpeded rotor before they can reach the rotor's bearing support. This is achieved by providing for a mount of the rotor on the bushing with the aforementioned freedom thereon, and further providing between the rotor and bushing a drive coupling which positively transmits pure drive torque but is otherwise sufficiently flexible not to interfere with the rotor's freedom on the bushing.

It is a further object of the present invention to provide for a motor of this type a dead-shaft rotor mount with the aforementioned rotor bushing, which is of exceeding structural simplicity and low cost, in that the bushing has a central recess or aperture that serves as the rotor bearing on the dead shaft, as well as a central shank on which the rotor is with a central recess axially slidable within limits and/or turnable quite freely for its aforementioned freedom on the bushing, and the drive coupling between rotor and bushing is formed by another recess in one face of the rotor and a therewith registering key on the bushing which, however, is so loosely fitted in this recess as to afford the rotor its freedom on the bushing and even determine its rotational freedom thereon, with the key on the bushing being preferably and advantageously an integral part of the latter. While this arrangement is advantageous for rotors of any permanent-magnet material, it is particularly advantageous for rotors of brittle high-H materials in that in the assembly of the rotor and bushing parts the rotor encounters no forces that could possibly fracture the same.

Another object of the present invention is to provide for a motor of this type a dead-shaft rotor mount with the aforementioned bearing bushing and mount of the rotor with freedom thereon, of which the rotor mounting and drive coupling provisions on the rotor and bushing are in comparison to the rotor diameter of quite extensive dimensions planewise of the rotor, so that the involved rotor recesses and the shank and key on the bushing will, on their mere and readily attained hold within predetermined, though not close, tolerances in efficient and low-cost mass production of the rotor and bushing parts, assuredly afford the rotor the desired adequate freedom on the bushing on their mere assembly and without requiring any tedious and costly inspection in this respect of the rotor and bushing assembly. The large-size rotor mounting and drive coupling provisions on the rotor and bushing are further advantageous for rotors of high-H materials which may be cast at correspondingly reduced bulk with an important savings in cost, yet at no sacrifice of the magnetic potential of the impressed rotor poles.

A further object of the present invention is to provide for a motor of this type a dead-shaft rotor mount in which the aforementioned recess in the rotor and therewith registering key on the bushing are simple tongue and groove formations which are advantageously formed symmetrically about two major axes of these formations and centered on the bushing axis for advantageous dynamic balance of the rotor in starting and running especially at the preferred large size of these formations.

It is another object of the present invention to provide for a motor of this type a dead-shaft rotor mount of which the aforementioned bearing bushing is preferably also provided with an integral drive pinion for added structural simplicity and cost reduction. Moreover, in thus providing the bushing with a drive pinion, the one-sided operational forces of the driving pinion will not interfere with the rotor's freedom on the bushing.

It is a further object of the present invention to provide for a motor of this type a dead-shaft rotor mount of which the aforementioned bearing bushing is advantageously a molded part of any suitable plastic which is not only of very low cost but also has good and lasting bearing properties and contributes toward a superior bearing support of the rotor on the dead shaft owing to the metallic and nonmetallic bearing surfaces of the respective parts. Further, a plastic bushing makes for quiet rotor performance and, owing to its light weight, keeps the inertia of the rotor assembly advantageously low particularly at the aforementioned preferred large size of the rotor mounting and drive coupling provisions on the rotor and bushing. Moreover, with the bushing being of plastic and, hence, a nonconductor of magnetic flux, the same will inherently prevent any flux shortcircuit between the rotor and field, and if the bushing is provided with a preferred integral drive pinion the same is not only nonmagnetic but further enhances quiet performance of the motor drive.

Another object of the present invention is to provide for a motor of this type a dead-shaft rotor mount the already low cost of which is still further reduced in that in the assembly of the rotor and preferred plastic bushing these parts are permanently locked in their assembled relation by simple staking without, however, depriving the rotor of its featured freedom on the bushing. This is achieved by a method involving staking the end of the bushing shank over the rotor thereon, whereby the shank may be hot-staked or simply cold-staked, for it has been found that in either type of staking the stake or stakes in the plastic bushing shank are locally sharply defined and are without outward bulging effect on the shank region immediately adjacent the staking to which the mounted rotor may extend either permanently or on axial shake if given such freedom on the bushing shank. Accordingly, the simple staking of the bushing for permanently locking the rotor and bushing in their assembled relation will in no wise curtail the rotor's freedom on the bushing which it had prior to staking.

Further objects and advantages will appear to those skilled in the art from the following, considered in conjunction with the accompanying drawings.

In the accompanying drawings, in which certain modes of carrying out the present invention are shown for illustrative purposes:

Figure 1:
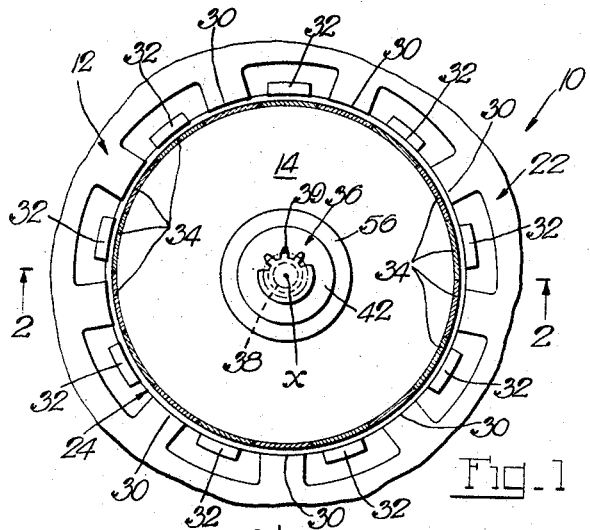
FIG. 1 is an enlarged fragmentary top view of a motor with a dead-shaft rotor mount that embodies the present invention.
Figure 2:
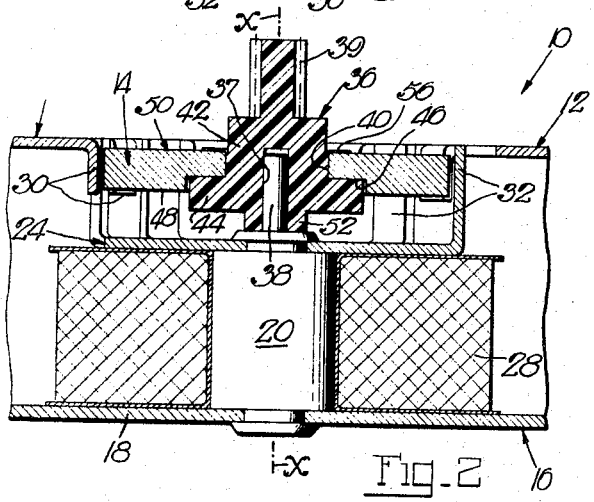
FIG. 2 is a fragmentary section through the motor taken substantially on the line 2—2 of FIG. 1.

Referring to the drawings, and more particularly to FIGS. 1 and 2 thereof, the reference numeral 10 designates a synchronous motor having a field 12 and a rotor 14. The field 12 comprises, in this instance, a conventional field cup 16 to the bottom 18 of which is secured a center core 20, and outer and inner field plates 22 and 24 which are suitably secured to the top of the field cup 16 and to the free end of the center core 20, respectively. Received in the field cup 16 and surrounding the center core 20 therein is a field coil 28. The outer and inner field plates 22 and 24 are provided with sets of inner and outer field poles 30 and 32, respectively, which are arranged circularly about a rotor axis $x$ and of which successive poles of one set alternate with successive poles of the other set in conventional manner. The rotor 14 is a permanent magnet with two series of pole faces 34 of opposite polarities which for the sake of clarity are shown in FIG. 1 as sectioned peripheral parts of the rotor. In accordance with one aspect of the present invention, the rotor 14 is provided with a center bushing 36 by means of which it is mounted on a fixed or dead shaft 38 in the center core 20 for rotation about the axis $x$. To this end, the bushing 36 is provided with an exemplary bearing recess 37 by which it is turnably received on the dead shaft 38. Owing to the rotor mount in this fashion on the dead shaft 38, the driving torque of the rotor must be transmitted to the motor load through the rotor bushing 36 in any event, and the latter has to this end an exemplary drive pinion 39.

In operation of the motor, alternating current is supplied to the field coil 28, thereby producing in the field poles 30 and 32 opposite instantaneous polarities which change in phase with the applied current, with the pole faces 34 of the rotor cooperating with the field poles 30 and 32 in driving the rotor in synchronism with the alternation of the current. To start the motor after a stop thereof, the rotor 14 will, on reenergization of the field coil 28, pass through a starting phase and take off in either direction, with the rotor being on a wrong-directional start reversed into the correct drive direction by a usually provided directional drive control (not shown) of which an exemplary type provides a stop from which a rotor-driven element rebounds on a wrong-directional rotor start and thereby reverses the entire motor drive, including the rotor, and against which the motor load is spring-backed in idle motor condition if the load is driven through spring intervention.

Figure 3:
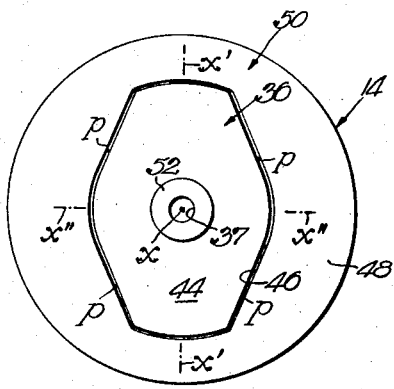
FIG. 3 is a plane view of a prominent subassembly of the motor.

For a reliable self-start of the rotor 14 on each reenergization of the field coil 28 the same will pass through two characteristic starting phases, during an initial phase of which the rotor becomes highly excited and responds in lively vibration about its axis to the polar magnetic forces, i.e., the permanent forces of the rotor poles 34 and those of the field poles 30 and 32 which are generated on each coil reenergization. With the rotor thus becoming highly excited in its initial starting phase, the same will quickly become highly unstable and take off with a predominant and usually overpowering urgency in either direction as the next and final starting phase from which it will usually step into phase with the applied current and develop full driving torque to assume the motor load. To permit the rotor 14 to respond in this highly excited fashion to the polar magnetic forces in its all-important initial starting phase, the rotor must have adequate freedom for this purpose even under unfavorable starting conditions at which the rotor bushing 36 encounters the entire motor load or the impediment of the aforementioned directional drive control on its slightest rotational motion in correct and incorrect drive directions, respectively. Accordingly, and in accordance with another aspect of the present invention, the rotor 14 is mounted on its bushing 36 with adequate rotational freedom to pass through its initial starting phase without any impediment from the motor load or from a directional drive control under any and all starting conditions. To this end, the rotor 14 is provided with a central aperture 40 by which it is turnably received on a cylindrical shank 42 of the bushing 36, and the bushing and rotor are further provided with complemental coupling parts 44 and 46 which have some play to permit free relative rotational movement between the rotor and bushing over a limited range, but act as a solid drive coupling between the rotor and bushing at either end of their free-motion range. The coupling parts 44 and 46 are in the exemplary form of registering tongue-and-groove formations on the bushing and rotor, with the tongue formation 44 being in this instance formed as an arm on the bushing 36 and the groove formation 46 being in the form of a recess in the face 48 of the rotor 14, and these tongue-and-groove formations having the exemplary play $p$ between them for the featured limited rotational freedom of the rotor 14 on the bushing 36 (FIG. 3). The rotor 14 will have this limited rotational freedom for its initial starting phase from any repose position whatsoever and regardless of whatever impediments the rotor bushing 36 may encounter on its slightest rotational motion from repose position in either direction. Accordingly, the rotor 14 will reliably undergo its initial starting phase, and as a result succeed to its final starting phase and an assured self-start at adequate torque either to assume the encountering motor load on a directionally correct self-start or to react with a directional drive control to reverse irresistably and then assume the motor load on a wrong-directional self-start. Self-starting of rotors is even enhanced by resorting to some well-known special expediencies, such as rotor and field pole coordination, for example, to the end of providing for magnetic unbalance between the rotor and field poles on each field coil reenergization. However, the present exemplary field poles 30, 32 and rotor poles 34 are shown balanced in the rotor repose position in FIG. 1, with all poles being spaced at the same pitch and all field poles and rotor poles being of identical peripheral widths, respectively, partly for the sake of simplicity of illustration and partly to demonstrate that even with the exemplary balanced polar arrangement the rotor has inherent self-starting characteristics owing to its featured limited rotational freedom for its initial starting phase, and will usually self-start, though not as reliably as rotors with the abovementioned special self-starting expediencies.

Figure 4:
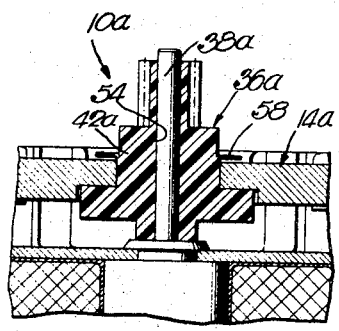
FIG. 4 is a fragmentary section through a motor with a dead-shaft rotor mount that embodies the invention in a modified manner.

The present motor 10 is shown in exemplary vertical operating position (FIG. 2) wherefore the assembled rotor and bushing unit 50 will by gravity be retained on the dead shaft 38, with the exemplary bushing 36 having beneath the arm 44 a reduced thrust end 52 with which the unit 50 rests in this instance on the center core 20. Of course, by making the dead shaft 38 sufficiently longer to space the bushing 36 from the center core 20, the inner end of the bearing recess 37 in the bushing will act as a thrust bearing for the rotor-bushing unit 50. Further, while the bushing 36 in FIG. 2 has the exemplary bearing recess 37, the rotor bushing 36a in the modified motor 10a of FIG. 4 has a through-and-through bearing aperture 54 for its reception on a longer dead shaft 38a. Also, for operation of the present motor in other positions, including a position inverted from that shown in FIG. 2, suitable stop provisions (not shown) are resorted to to prevent axial escape of the rotor-bushing assembly 50 from the dead shaft 38.

For the assembly of the rotor 14 and bushing 36 into the unit 50, the rotor 14 is with its center aperture 40 slipped over the bushing shank 42, whereby the tongue-and-groove formations 44, 46 on the bushing and rotor are aligned with each other for their registry in the slip-on application of the rotor to the bushing. Next, the slipped-on rotor 14 is secured against axial removal from the bushing shank 42 over the free end of the latter without, however, in any way depriving the rotor of its limited freedom of rotation on the bushing 36. This may be done in any suitable manner, and is here done preferably by simple staking to-be-described of the free end of the bushing shank substantially against the rotor as at 56 in FIG. 2, or by the same simple staking of the bushing shank 42a toward, but not against, the rotor 14a as at 58 in FIG. 4 so as to leave the rotor 14a also with some axial freedom of motion on its bushing 36a.

The exemplary bushing 36 of FIGS. 1 to 3 is, in comparison to the outer diameter of the rotor 14, preferably and advantageously of relatively large cross-sectional dimensions at least in its tongue or arm formation 44, but preferably also in its shank formation 42, with the groove formation 46 in the rotor 14 and the center aperture 40 in the latter being dimensioned similarly large. With this preferred dimensional arrangement, the portions of the rotor and bushing involved in the rotor mount on the bushing with the featured rotor freedom thereon will, on their mere and readily attained hold within predetermined, though not close, tolerances in efficient and low-cost mass production of the rotors and bushings, assuredly afford the rotor the desired adequate freedom on the bushing on their mere assembly and without requiring any tedious and costly inspection or testing in this respect of the assembled rotor and bushing units 50 other than perhaps their barest feel by the assembling personnel by which the required freedom of the rotor on the bushing is readily perceptible. The advantage of this becomes all the more apparent in view of the relatively small diameters of rotors in most synchronous motors, and further considering that the rotor's freedom on its bushing, while imperative for the stated purpose, must not exceed a fair tolerance beyond which the rotor's freedom is excessive and adversely affects rotor and, hence, motor performance. Without any intended limitation but mentioned merely by way of example, the rotor and bushing illustrated in FIGS. 1 and 3 are of the exact proportionate dimensions of an actual rotor and bushing of smaller size used in a synchronous motor of which the actual rotor diameter was .750", with the illustrated rotor and bushing demonstrating the relatively large cross-sectional dimensions of the above-mentioned bushing and rotor parts in comparison to the outer rotor diameter.

For dynamic balance of the rotor and bushing assembly 50, the arm formation 44 on the bushing 36 and the groove formation 46 in the rotor 14 are preferably formed symmetrically about two major rectangular axes of these formations and also centered on the axis $x$. Thus, these formations 44 and 46 are symmetrical about their major rectangular axes $x'$ and $x''$ which extend normal to the axis $x$ and intersect the same (FIG. 3).

The bushing 36 may be of any suitable material, but is, in accordance with another aspect of the invention, preferably and advantageously a molded part of any suitable tough and strong plastic, such as Delrin or nylon. Thus, a molded plastic bushing is not only of very low cost, but also has good and lasting bearing properties and contributes toward a superior bearing support of the rotor on the dead shaft owing to the metallic and nonmetallic bearing surfaces of the respective parts. Further, a plastic bushing makes for quiet rotor performance and, owing to its light weight, keeps the inertia of the rotor assembly low, particularly at the described preferred large size of the rotor mounting and drive coupling provisions on the rotor and bushing. Also, with the plastic bushing 36 being preferably provided with the integral drive pinion 39, the latter is not only nonmagnetic but also further enhances quiet performance of the motor drive.

The plastic bushing 36 is further highly advantageous for the mount of rotors 14 of more and more preferred high-H materials which, however, are so brittle that they fracture almost invariably on being pressfitted or firmly staked to heretofore metallic bushings. Thus, with the rotor 14 of exemplary high-H material having the featured limited rotational freedom on the bushing shank 42, the rotor will on its slip onto the latter in the described assembly of the rotor and bushing parts assuredly undergo no stresses which could possibly fracture the rotor. Further, while different, though rather costly, known or self-evident expediencies may be resorted to in order to lock the rotor against axial removal from the bushing over the free end of the bushing shank without depriving the rotor of its featured freedom on the bushing, the plastic bushing 36 is particularly advantageous in that respect in that it has been found quite surprisingly that it lends itself to simple and inexpensive hot-staking or cold-staking without incurring the inevitable outward bulge in the bushing region immediately adjacent the staking on metallic bushings. Thus in locking the rotor to the plastic bushing against axial removal therefrom by preferred staking, there is involved a staking method according to still another aspect of the present invention which imposses no stresses on the rotor that would fracture the same if of any brittle high-H material, and the staking may even be done sufficiently close to the rotor to prevent virtually any axial freedom of the same on the bushing without depriving the rotor of its imperative limited rotational freedom on the bushing. This staking method is demonstrated in alternate ways in FIGS. 5 and 6. Thus, in FIG. 5 the staking tool 60 has a blunt and in this instance slightly tapered staking end 62 which on a relatively light blow by the tool against an outer peripheral margin of the free end 64 of the plastic bushing shank 42b stakes the same into the shoulder formation 66 by which the rotor 14b is locked against axial removal from the plastic bushing 36b which is located and removably held in a suitable fixture 68 during the staking operation. In thus staking the bushing shank 42b, the actual stake 66 is shown somewhat separated from the rotor 14b by an axially very short intervening shank portion 70 over which the rotor has axial freedom and retains its rotational freedom since this shank portion 70 did not undergo any outward bulging in consequence of the staking. Further, the exemplary staking in FIG. 5 may be cold-staking, i.e., without heating the staking tool 60, or the latter may be heated and by a quick blow applied to the bushing shank for hot-staking the same. Therefore, hot-staking of the bushing shank in this fashion still involves blow-application of the staking tool to the bushing shank and, hence, is different from and not to be confused with fusion-staking by applied heat and pressure. There is this further aspect that the hot or cold staking in FIG. 5 may be done entirely mechanically, i.e., with a preset blow force from the tool 60 at which numerous bushings will be staked identically and as desired.

Figure 5:
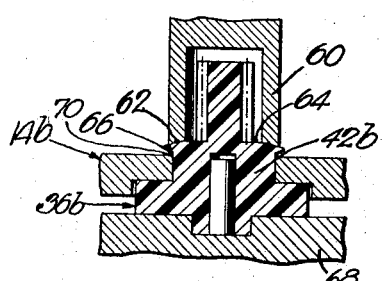
FIGS. 5 and 6 are fragmentary sections through tools in which the subassembly of FIG. 3 is finished in different ways according to a method of the invention.
Figure 6:
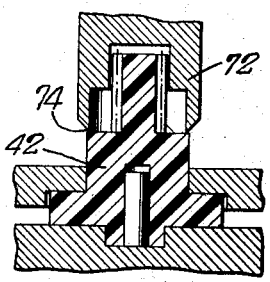

The staking procedure in FIG. 6 may in most respects be like that in FIG. 5, except that the staking tool 72 is adapted for shear-staking, the tool 72 having to this end a shear edge 74 with which to shear from the bushing shank 42 the collar-like stake 56 in FIG. 2, for example, on quick blow application of the tool to the bushing shank in FIG. 6. Of course, while in FIGS. 5 and 6 the staking tools 60 and 72 have their staking ends formed to produce annularly continuous stakes, it is fully within the purview of the invention to arrange the staking ends of these tools so that they produce local stakes at angularly spaced portions of the bushing shank rather than annularly continuous stakes.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In a synchronous reaction motor, the combination with a field including field poles arranged circularly about an axis, and a coil acting when energized to excite said field; of a dead-shaft rotor mount having a fixed shaft about said axis, a bushing part having a bearing recess turnably received on said shaft and a cylindrical surface concentric with said axis, a permanent-magnet rotor part having poles and a central aperture turnably received on said cylindrical surface of said bushing part, and rigid shoulders on said parts, respectively, being in each other's path on relative rotation between said parts and having play between them for free relative rotational movement between said parts over a limited range but acting as a solid drive coupling between said parts at either end of their free-motion range.

2. In a synchronous reaction motor, the combination with a field including field poles arranged circularly about a first axis, and a coil acting when energized to excite said field; of a dead-shaft rotor mount having a fixed shaft about said axis, a bushing having a bearing recess turnably received on said shaft and a cylindrical shank concentric with said axis, a permanent-magnet rotor having poles and a central aperture turnably received by said shank, and rigid registering tongue and groove formations on said bushing and in said rotor, respectively, for drivingly connecting said bushing and rotor, with said formations having play between them for free relative rotational motion between said rotor and bushing over a limited range but acting as a solid drive coupling between said rotor and bushing at either end of their free-motion range.

3. The combination in a synchronous reaction motor as in claim 2, in which said bushing has an integral drive pinion formation coaxial with said shank.

4. The combination in a synchronous reaction motor as in claim 2, in which said bushing is of plastic.

5. The combination in a synchronous reaction motor as in claim 2, in which said rotor has also limited axial freedom on said bushing shank.

6. The combination in a synchronous reaction motor as in claim 2, in which said groove formation is provided in one of the opposite faces of said rotor, and said tongue formation is an arm on said bushing.

7. The combination in a synchronous reaction motor as in claim 6, in which for dynamic balance of said rotor and bushing said groove formation and arm are symmetrical about major rectangular axes thereof which extend normal to said first axis and intersect the latter.

8. The combination in a synchronous reaction motor as in claim 7, in which the cross-sectional area of said arm is larger than that of said bushing shank and said arm serves as an axial support for said rotor.

9. The combination in a synchronous reaction motor as in claim 6, in which said bushing is of plastic, said arm is at one end of said bushing and serves as an axial stop for said rotor on said bushing shank, and there is a stake formation in said bushing shank at the other end thereof for permanent retention of said rotor on said bushing shank.

10. The combination in a synchronous reaction motor as in claim 9, in which said bushing has at said other end of said shank an integral drive pinion formation coaxial with said shank and of smaller cross-sectional dimension than said shank.

11. The combination in a synchronous reaction motor as in claim 2, in which said bearing recess in said bushing is a through-passage in the latter.

References Cited

UNITED STATES PATENTS

| | | | |
|---|---|---|---|
| 2,883,840 | 4/1959 | Geiger | 310—164 |
| 3,175,110 | 3/1965 | Kohlhagen | 310—164 |
| 3,308,315 | 3/1967 | Mahon et al. | 310—164 |
| 3,333,129 | 7/1967 | Kohlhagen | 310—164 |
| 3,027,469 | 3/1962 | Sidell | 310—41 |

J. D. MILLER, *Primary Examiner.*

L. L. SMITH, *Assistant Examiner.*

U.S. Cl X.R.

310—41